UNITED STATES PATENT OFFICE.

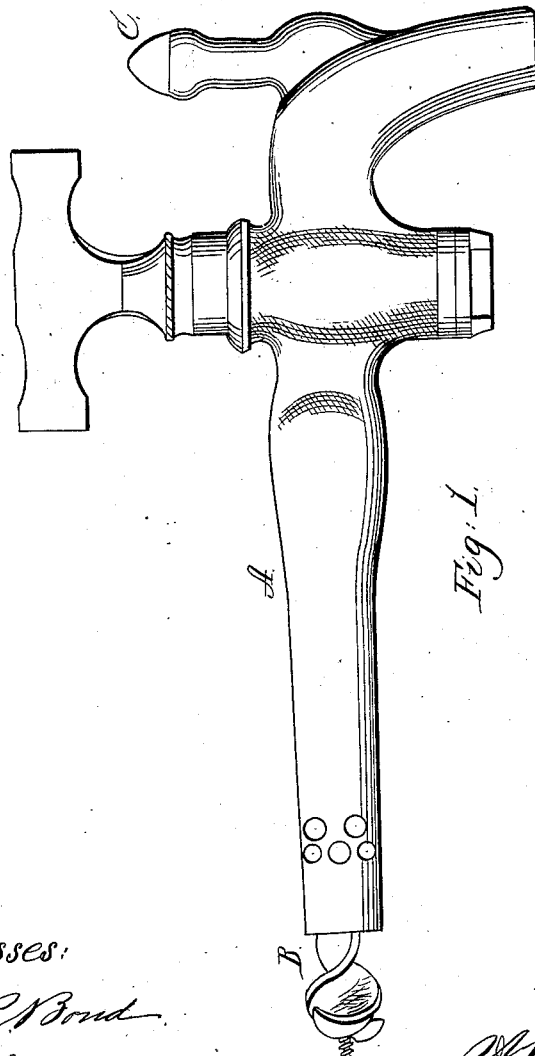

A. W. P. LADD, OF SAN FRANCISCO, CALIFORNIA.

FAUCET.

Specification of Letters Patent No. 32,699, dated July 2, 1861.

*To all whom it may concern:*

Be it known that I, A. W. P. LADD, of the city and county of San Francisco and State of California, have invented a new and Improved Faucet for Beer-Barrels, Wine-Casks, &c.; and I do hereby declare that the following is a full, clear, and exact description of the construction and operation of the same, reference being had to the annexed drawings, making a part of this specification, in which—

A, represents a common faucet; B, is a short auger inserted in the end of the faucet; C, is a sort of horn or projection at the nozzle end of the faucet, forming with the nozzle, a handle for the auger. The auger should be galvanized to prevent its rusting.

Operation: Use the auger to bore a hole in the cask, when the hole is made immediately push the faucet into place, and drive it in firmly. The auger being galvanized will not rust, but will answer for use many times.

Having thus described my invention, what I claim and desire to secure by Letters Patent, is:

The combination of a faucet and auger B, with a horn or projection C, when arranged in relation to each other as and for the purpose described.

A. W. P. LADD.

Witnesses:
CHAS. R. BOND,
F. I. THIBAULT.